3,253,949
ELECTRODES FOR ELECTRIC ARC WELDING AND HARDSURFACING OF GREY AND HIGH-STRENGTH CAST-IRONS
Guennadi Nickolaevich Larin, Pervomaiskaia 25, Apt. 4, Moscow, U.S.S.R.
Filed Dec. 7, 1961, Ser. No. 158,644
6 Claims. (Cl. 117—205)

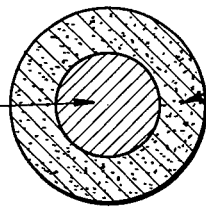
Steel Which Contains Carbide Forming Elements e.g. Ti, V And/Or Nb
May Contain Ferro Alloy Of Ti, V And/Or Nb

United States Patent Office 3,253,949
Patented May 31, 1966

This invention relates to electrodes for electric arc welding and hard-surfacing of grey and high-strength cast-irons.

This invention refers to the welding engineering branch and, more particularly, to electrodes for electric arc welding and hard-surfacing of grey and high-strength cast-irons without preheating "cold" welding and hard-surfacing.

It is well known that electric arc welding and hard-surfacing of grey and high-strength cast-irons ("cold" welding and hard-surfacing) is to a considerable degree rendered difficult, due to the presence of carbon in cast-iron.

Therefore the technology of electric welding and hard-surfacing of such cast-irons is based, principally, upon reducing the unfavourable effect of carbon upon the welded seam metal and the melting zone, during the process of welding or hard-surfacing. This is usually attained by the application of steel electrodes provided with an oxidizing coating or by welding with some oxidizing fluxing agent ensuring decarbonization of the welded seam metal, or by the application of iron-nickel, copper-nickel, iron-copper electrodes, since in the process of welding or hard-surfacing with such electrodes iron carbides are not formed in the hard-surfacing metal. Steel and cast-iron electrodes provided with graphitizing coating are also used.

However, all the electrodes, known in welding engineering, do not solve the problem of electric welding of grey and high-strength cast-irons, since they do not sufficiently eliminate the hardening of the weld seam metal and do not produce welding seams of sufficient stability.

It has now been established that the problem of electric arc welding and hard-surfacing of grey and high-strength cast-irons can be successfully solved with the application of the electrodes forming the object of the present invention. These electrodes contain in their composition (in the material of the core, or in the composition of the coating, or in the material of the core as well as in the composition of the coating) alloying elements which, during the process of welding or hard-surfacing take the carbon from the solid solution in the iron and form, with this carbon, independent carbides of the type $Me_nC_m$.

The object of this invention is to develop such electrodes for electric arc welding of grey and high-strength cast-irons which would eliminate the effect of the carbon contained in cast-iron upon hard-surfacing the properties of the metal.

Another object of the invention is to obtain a welded seam or hard-surfacing metal which can be easily treated by means of cutting tools.

A further object of the invention is to obtain steady burning of the arc.

A further aim of the invention is to obtain a higher quality of the hard-surfacing metal, free of pores, honey-combs, cracks, ruptures and other defects.

Other purposes and advantages of the invention will become evident from the following detailed description, which also includes the preferable method of accomplishing the invention. The single figure of drawing is a view in section showing the welding rod of this invention.

It is clear that certain modifications with respect to the precise accomplishment of the invention here dealt with may be provided within the limits of the items of the claims, without deviating from the general idea of the invention.

The electrodes herein described are manufactured as coated electrodes and contain, in the material of the electrode cores, or in the composition of their coating, or in both the cores and the coating, alloying elements which, during the process of welding or hard-surfacing, take the carbon from the solid solution of the cast-iron and with this carbon build up carbides of the kind $Me_nC_m$.

It is proposed, according to the present invention, to use as such alloying elements building up carbides, titanium, vanadium and niobium, which are inserted into the electrodes either separately (the electrode contains only one of these elements) or in combinations of two elements (the electrode contains any two of the above-mentioned elements) or all three simultaneously [the electrode contains all three elements].

The introduction of titanium, vanadium and niobium into cast-irons considerably reduces or may even entirely eliminate its hardening. This is due to the fact that titanium, vanadium and niobium, which build up only independent carbides, take the carbon from the solid solution in the cast-iron and thus reduce the possibility of the iron becoming of a low stability.

If into the hard-surfacing metal, which contains 0.8–1.5% of carbon, there are inserted titanium, vanadium or niobium or a combination of the same in such a quantity that the ratio of the content of these elements to the content of carbon in the cast-iron is equal to 4:1; 7:1; 8:1 respectively hardening of the seam can be entirely eliminated.

Consequently, it is possible to obtain, when welding or hard-surfacing of even solid cast-iron parts, welded seams having a Brinell hardness of 180–190 (according to the $H_b$ scale), which can be easily submitted to mechanical treatment.

The presence of such carbide-forming elements as titanium, vanadium and niobium in the metal seam produces a favourable effect with respect to decreased blanching, of a cementite nature, in the zones adjacent to the seam when welding cast-iron without preheating, which is probably connected with diffusion of carbon from the melting zone in the seam metal.

It can be proved by metallographic analysis, that when hard-surfacing cast-iron of the first layer by means of electrodes, containing elements which form carbides, the layer formed in the melting zone is not of a cementite, but principally martensite, and is easily annealed by surfacing with a second layer. Cementite sections having the shape of trimmings of graphitic inclusions, exist chiefly in the main metal beyond the melting zone, but due to their small dimensions and intermittent nature they have almost no effect on the conditions of mechanical treatment of the welded joint.

If carbide forming elements are introduced into the electrode coating, the latter should have the following composition:

Ferrovanadium or ferroniobium 60–70%, or titanium powder 40–50%, marble or dolomite 6–8%, fluorspar or ferrotitanium 6–18%, ferrosilicon or feldspare 1–10%, potassium carbonate or potassium nitrate 1–10%, and sodium silicate 20–30% of the total weight of all components.

In particular, the following actual composition of the coating is suitable:

| | Percent |
|---|---|
| Ferrovanadium | 60 |
| Marble | 15 |
| Fluorspar | 18 |
| Ferrosilicon | 4 |
| Potassium nitrate | 3 |
| Sodium silicate | 25–30 | of the total weight of dry mixture of all the components.

The weight of the coating in relation to the weight of the core may be 50–52%.

The coating is applied by immersion or by pressing.

For a core 4 mm. in diameter, the thickness of the coating should be 1.1–1.2 mm.

Tempering of the electrodes after drying them in air [20–24 hours] is to be performed at a temperature of 330–350° C. in the course of 1 hour.

Another specific composition of electrode coating can be recommended:

| | Percent |
|---|---|
| Ferroniobium | 65 |
| Marble | 13 |
| Fluorspar | 15 |
| Ferrosilicon | 4 |
| Potassium nitrate | 3 |
| Sodium silicate | 25–30 | of the total weight of dry mixture.

The weight of the coating in relation to the weight of the core is 60–62%.

The thickness of the coating is 1.2–1.3 mm.

The hard-surfacing metal has the following composition:

(a) for vanadium electrodes:

| | Not over percent, maximum |
|---|---|
| Carbon | 0.20 |
| Silicon | 1.0 |
| Manganese | 0.40 |
| Vanadium | 6.0–13.0 |
| Sulphur | 0.04 |
| Phosphorus | 0.04 |

(b) for niobium electrodes:

| | |
|---|---|
| Carbon | 0.20 |
| Silicon | 1.0 |
| Manganese | 0.40 |
| Niobium | 7.0–10.0 |
| Sulphur | 0.04 |
| Phosphorus | 0.04 |

Carbide-forming elements can also be introduced into the seam metal by using electrodes having an alloyed steel core.

The composition of these electrodes is as follows:

| | Not over percent, maximum |
|---|---|
| Carbon | 0.2 |
| Silicon | 1.0 |
| Manganese | 0.5 |
| Sulphur | 0.04 |
| Phosphorus | 0.04 |

| | Maximum percent |
|---|---|
| Vanadium or niobium | 9.0–19 |
| or | |
| Titanium | 4.0–10 |

In this case the electrode coating contains:

| | Percent |
|---|---|
| Fluorspar | 10–20 |
| or | |
| Ferrotitanium | 1–10 |
| Ferrosilicon or feldspar | 1–10 |
| Ferromanganese [low carbon content] | 1–10 |
| Potassium carbonate or potassium nitrate | 1–10 |

There may also be used electrodes having the following composition of the core:

| | Not over percent, maximum |
|---|---|
| Carbon | 0.2 |
| Silicon | 1.0 |
| Manganese | 0.5 |
| Niobium | 9–19 | or electrodes containing:

| | |
|---|---|
| Carbon | 0.2 |
| Silicon | 1.0 |
| Manganese | 0.5 |
| Titanium | 4–10 |

Welding conditions, for welding, with the electrodes as described, of high strength cast-iron of $B_z$ 40–10 quality to steel 45:

Welding current—60–70 a.,
Voltage—24–25 v. or welding current 100–120 a.,
Voltage—25–26 v.

Of the carbide-forming elements indicated above, the most favourable one for application is vanadium, because it is better assimilated by the metal than titanium and is not as scarce as niobium.

Carbide alloy hard-surfacing cast-iron with the application of the above-mentioned electrodes can, without any difficulty, be subjected to further hard-surfacing by various special alloys, including wear-resistant alloys.

I claim:
1. Coated electrodes for electric arc welding and hard-surfacing of grey and high-strength cast-irons, without preheating, the coating of which consists essentially of: ferrovanadium 60–70%, marble 6–18%, fluorspar 6–18%, feldspar 1–10%, potassium carbonate, 1–10% and sodium silicate 20–30% of the total weight of all the components.

2. Coated electrodes for electric arc welding and hard-surfacing of grey and high-strength cast-irons, without preheating, the coating of which consists essentially of: ferroniobium 60–70%, dolomite 6–18%, ferrotitanium 6–18%, ferrosilicon 1–10%, potassium nitrate 1–10% and sodium silicate 20–30% of the total weight of all components.

3. Coated electrodes for electric arc welding and hard-surfacing of grey and high-strength cast-irons, without preheating, the coating of which consists essentially of: titanium powder 40–50%, marble 6–18%, ferrotitanium 6–18%, ferrosilicon 1–10%, potassium carbonate 1–10% and sodium silicate 20–30% of the total weight of all the components.

4. Coated electrodes for electric arc welding and hard-surfacing of grey and high-strength cast-irons, without preheating, the steel cores of which consist essentially of: carbon—up to 0.2%, silicon—maximum of 1.0%, manganese—up to 0.5%, sulphur—maximum of 0.04%, phosphorus—up to 0.04%, vanadium 9–19%, balance iron; and the electrode coating consists essentially of: fluorspar 10–20%, ferrosilicon 1–10%, ferromanganese of low-carbon content 1–10%, potassium carbonate 1–10%.

5. Coated electrodes for electric arc welding and hard-surfacing of grey and high-strength cast-irons, without preheating, the cores of which consist essentially of: carbon—maximum of 0.2%, silicon—maximum of 1.0%, manganese—not over 0.5%, niobium 9–19%, balance iron and a coating thereon, the weight of the coating being about 50% of the weight of the core.

6. Coated electrodes for electric arc welding and hard-surfacing of grey and high-strength cast-irons, without preheating the cores of which consist essentially of: carbon—maximum of 0.2%, silicon—maximum of 1.0%, manganese—not over 0.5%, titanium 4–10%, balance iron and a coating thereon, the weight of the coating being about 50% of the weight of the core.

References Cited by the Examiner

UNITED STATES PATENTS 2,512,430  6/1950  Kihlgren _____ 117—205
2,544,334  3/1951  Linnert _____ 117—205

OTHER REFERENCES

Hansen, "Constitution of Binary Alloys," 2nd ed., 1958, McGraw-Hill, New York, pages 675–677, 723–727 and 729–732 relied on.

RICHARD D. NEVIUS, *Primary Examiner*.
JOSEPH B. SPENCER, *Examiner*.